(12) United States Patent
Spin et al.

(10) Patent No.: US 11,437,874 B2
(45) Date of Patent: Sep. 6, 2022

(54) GENERATOR STATOR END WINDING COIL SUPPORT ASSEMBLY

(71) Applicant: Siemens Energy, Inc., Orlando, FL (US)

(72) Inventors: Philipp Spin, Düsseldorf (DE); Keegan M. Ford, Fort Mill, SC (US); Hendrik Steins, Essen (DE); Stephan Werkmeister, Essen (DE); Michael Verbanic, Charlotte, NC (US); Benjamin Todd Humphries, Orlando, FL (US); Thomas Ebbert, Rhede (DE)

(73) Assignee: Siemens Energy, Inc., Orlando, FL (US)

( * ) Notice: Subject to any disclaimer, the term of this patent is extended or adjusted under 35 U.S.C. 154(b) by 95 days.

(21) Appl. No.: 16/970,803

(22) PCT Filed: Mar. 27, 2018

(86) PCT No.: PCT/US2018/024517
§ 371 (c)(1),
(2) Date: Aug. 18, 2020

(87) PCT Pub. No.: WO2019/190474
PCT Pub. Date: Oct. 3, 2019

(65) Prior Publication Data
US 2021/0111597 A1 Apr. 15, 2021

(51) Int. Cl.
*H02K 1/18* (2006.01)
*H02K 1/16* (2006.01)
(Continued)

(52) U.S. Cl.
CPC .............. *H02K 1/185* (2013.01); *H02K 1/16* (2013.01); *H02K 3/505* (2013.01); *H02K 3/51* (2013.01);
(Continued)

(58) Field of Classification Search
CPC ............ H02K 1/16; H02K 1/18; H02K 1/185; H02K 3/50; H02K 3/505; H02K 3/51; H02K 3/52; H02K 3/522; H02K 3/525
(Continued)

(56) References Cited

U.S. PATENT DOCUMENTS 3,975,655 A    8/1976   Beermann et al.
4,525,642 A *   6/1985   Humphries ............ H02K 3/505
                                                                                                310/260
(Continued)

FOREIGN PATENT DOCUMENTS

JP      S5934482 U    3/1984
JP      H0318648 U    2/1991
JP      2015204641 A   11/2015

OTHER PUBLICATIONS

PCT International Search Report and Written Opinion dated Nov. 29, 2018 corresponding to PCT Application No. PCT/US2018/024517 filed Mar. 27, 2018.

*Primary Examiner* — Rashad H Johnson

(57) ABSTRACT

A generator stator end winding coil support assembly is presented. The assembly includes a bracket rigidly secured to a core flange plate and a brace clamped between a backup plate and the bracket by studs. The brace connects to an inner support ring. An elastic layer is disposed around the brace. Sleeves are disposed in apertures of the brace and enclose the studs. The sleeves set up a gap at interfaces between the brace and the bracket and between the brace and the backup plate that defines a compression of the elastic layer. The compression enables the brace to be movable relative to the bracket rigidly secured to the core flange plate for flexibly supporting the end winding coils. Flexibility and stiffness of the support is controllable by adjusting clamping (Continued)

force of the studs and selection of the elastic layer based on load conditions during operation.

18 Claims, 3 Drawing Sheets

(51) Int. Cl.
    *H02K 3/50*     (2006.01)
    *H02K 3/52*     (2006.01)
    *H02K 3/51*     (2006.01)

(52) U.S. Cl.
    CPC .............. *H02K 3/52* (2013.01); *H02K 3/522* (2013.01); *H02K 3/525* (2013.01)

(58) Field of Classification Search
    USPC ............ 310/71, 89, 216.114, 216.118, 254.1
    See application file for complete search history.

(56) References Cited

U.S. PATENT DOCUMENTS

| | | | | |
|---|---|---|---|---|
| 4,618,795 A * | 10/1986 | Cooper | H02K 3/505 | 310/43 |
| 4,642,493 A * | 2/1987 | Wallace | H02K 9/04 | 310/67 R |
| 4,894,573 A * | 1/1990 | Simpson | H02K 15/028 | 310/216.124 |
| 4,942,326 A * | 7/1990 | Butler, III | H02K 3/505 | 174/DIG. 20 |
| 5,051,642 A * | 9/1991 | Hediger | H02K 3/505 | 310/260 |
| 5,053,663 A * | 10/1991 | Boer | H02K 3/47 | 310/179 |
| 5,117,140 A * | 5/1992 | Sargeant | H02K 5/00 | 310/91 |
| 5,140,740 A * | 8/1992 | Weigelt | H02K 3/505 | 310/260 |
| 5,355,046 A * | 10/1994 | Weigelt | H02K 3/505 | 174/DIG. 20 |
| 5,373,211 A * | 12/1994 | Ramirez-Coronel | H02K 3/505 | 310/43 |
| 5,436,520 A * | 7/1995 | Huber | H02K 3/505 | 310/43 |
| 5,485,050 A * | 1/1996 | Zimmermann | H02K 3/505 | 310/260 |
| 5,530,305 A * | 6/1996 | Krueger | F02B 61/045 | 310/263 |
| 5,583,388 A * | 12/1996 | Paroz | H02K 3/505 | 310/260 |
| 5,650,679 A * | 7/1997 | Boggs, III | H02K 49/043 | 310/90 |
| 5,752,774 A * | 5/1998 | Heshmat | F16C 27/04 | 384/549 |
| 5,773,906 A * | 6/1998 | Mukai | H02K 13/02 | 310/43 |
| 5,798,595 A * | 8/1998 | Nilsson | H02K 3/505 | 29/736 |
| 6,104,116 A * | 8/2000 | Fuller | H02K 1/16 | 310/216.127 |
| 6,218,759 B1 * | 4/2001 | Blakelock | H02K 3/505 | 310/260 |
| 6,337,530 B1 * | 1/2002 | Nakamura | H02K 5/15 | 310/216.066 |
| 2002/0171318 A1 * | 11/2002 | Wang | H02K 3/527 | 310/261.1 |
| 2004/0007937 A1 * | 1/2004 | Stallone | H02K 3/505 | 310/260 |
| 2004/0256947 A1 * | 12/2004 | Montgomery | H02K 1/16 | 310/260 |
| 2010/0018039 A1 * | 1/2010 | Sakakiabara | H02K 15/022 | 29/732 |
| 2013/0113334 A1 * | 5/2013 | Allen | H02K 1/185 | 310/216.134 |
| 2014/0246946 A1 * | 9/2014 | Jaluthariya | H02K 3/505 | 310/260 |
| 2015/0042529 A1 * | 2/2015 | Tanaka | H01Q 7/00 | 343/788 |
| 2015/0171715 A1 * | 6/2015 | Pettit | H02K 15/0006 | 310/216.113 |
| 2015/0171719 A1 * | 6/2015 | Pettit | H02K 15/0006 | 310/216.113 |
| 2015/0222151 A1 * | 8/2015 | Semken | H02K 1/278 | 29/452 |
| 2015/0295472 A1 | 10/2015 | Kuraishi | | |
| 2017/0201164 A1 * | 7/2017 | Copeland, Jr. | H02K 1/16 | |
| 2021/0367494 A1 * | 11/2021 | Takahashi | H02K 15/022 | |
| 2021/0384802 A1 * | 12/2021 | Tamura | H02K 21/22 | |

* cited by examiner

GENERATOR STATOR END WINDING COIL SUPPORT ASSEMBLY

TECHNICAL FIELD

The present invention relates generally to a generator stator of an electric machine, and more in particular, a generator stator end winding coil support assembly for a large turbine generator.

DESCRIPTION OF RELATED ART

Generator is a component that converts mechanical power to electrical power in power generation industry. Generator typically includes a stator and a rotor each comprised of a plurality of electrical conductors, such as winding coils. During generator operation, the generator stator end winding coils are subjected to a variety of loading conditions that may adversely affect performance of the generator stator end wing coils and may lead to a premature failure. These loading conditions include thermo-mechanical forces, electro-mechanical forces causing steady state vibration, transient operating conditions and abnormal operating conditions such as three phase short circuits or out of phase synchronizations. These loading conditions lead to sever performance risks due to continued pressures of cost reduction and performance improvement.

Many of these loading conditions, however, conflict with each other. For example, increasing stiffness may help reduce steady state vibration magnitudes, but may also increase strain due to thermo-mechanical loads. Generator stators having design features that improve performance under one load condition may decrease performance under another load condition. Finding a right balance between these loading conditions and finding design features to achieve design and performance requirements is a challenge and valuable for generator stator design.

SUMMARY OF INVENTION

Briefly described, aspects of the present invention relate to a generator stator, an assembly and a method for supporting generator stator end winding coils.

According to an aspect, a generator stator is presented. The generator stator comprises a stator core and a core flange plate mounted at an axial end of the stator core. The generator stator comprises a plurality of end winding coils extending axially outwardly from the core flange plate. The generator stator comprises an inner support ring axially located inboard and circumferentially enclosing the end winding coils for supporting the end winding coils. The generator stator comprises a plurality of end winding coil support assemblies circumferentially disposed along an outer peripheral surface of the core flange plate and extending axially outwardly from the core flange plate and connected to the inner support ring. Each end winding coil support assembly comprises a bracket rigidly secured to the core flange plate, a backup plate, a brace disposed between the bracket and the backup plate and extending radially downwardly connected to the inner support ring. The end winding coil support assembly comprises an elastic layer disposed around the brace at an interface between the bracket and the backup plate. At least one stud extends through the bracket, the brace, the elastic layer and the backup plate for clamping said components together. The brace comprises an aperture that is larger than a diameter of the stud extending therethrough. A sleeve is disposed in the aperture and encloses the stud. The sleeve sets up a gap at interfaces between the brace and the bracket and between the brace and the backup plate that defines a compression of the elastic layer for accommodating vibration and damping during operation of the generator stator. The compression of the elastic layer enables the brace to be movable relative to the bracket rigidly secured to the core flange plate for flexibly supporting the end winding coils.

According to an aspect, an assembly for supporting end winding coils of a generator stator is presented. The generator stator comprises a stator core, a core flange plate mounted at an axial end of the stator core and an inner support ring circumferentially enclosing the end winding coils extending axially outwardly from the core flange plate. The assembly comprises a bracket rigidly secured to the core flange plate, a backup plate, a brace disposed between the bracket and the backup plate and extending radially downwardly connected to the inner support ring. The assembly comprises an elastic layer disposed around the brace at an interface between the bracket and the backup plate. At least one stud extends through the bracket, the brace, the elastic layer and the backup plate for clamping said components together. The brace comprises an aperture that is larger than a diameter of the stud extending therethrough. A sleeve is disposed in the aperture and encloses the stud. The sleeve sets up a gap at interfaces between the brace and the bracket and between the brace and the backup plate that defines a compression of the elastic layer for accommodating vibration and damping during operation of the generator stator. The compression of the elastic layer enables the brace to be movable relative to the bracket rigidly secured to the core flange plate for flexibly supporting the end winding coils.

According to an aspect, a method for supporting end winding coils of a generator stator is presented. The generator stator comprises a stator core, a core flange plate mounted at an axial end of the stator core and an inner support ring circumferentially enclosing the end winding coils extending axially outwardly from the core flange plate. The method comprises rigidly securing a bracket to the core flange plate. The method comprises disposing a brace between the bracket and a backup plate and extending radially downwardly connected to the inner support ring. The method comprises disposing an elastic layer around the brace at an interface between the bracket and the backup plate. The method comprises clamping the backup plate, the brace, the elastic layer and the bracket together by at least one stud extending therethrough. The brace comprises an aperture that is larger than a diameter of the stud extending therethrough. A sleeve is disposed in the aperture and encloses the stud. The sleeve sets up a gap at interfaces between the brace and the bracket and between the brace and the backup plate that defines a compression of the elastic layer for accommodating vibration and damping during operation of the generator stator. The compression of the elastic layer enables the brace to be movable relative to the bracket rigidly secured to the core flange plate for flexibly supporting the end winding coils.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
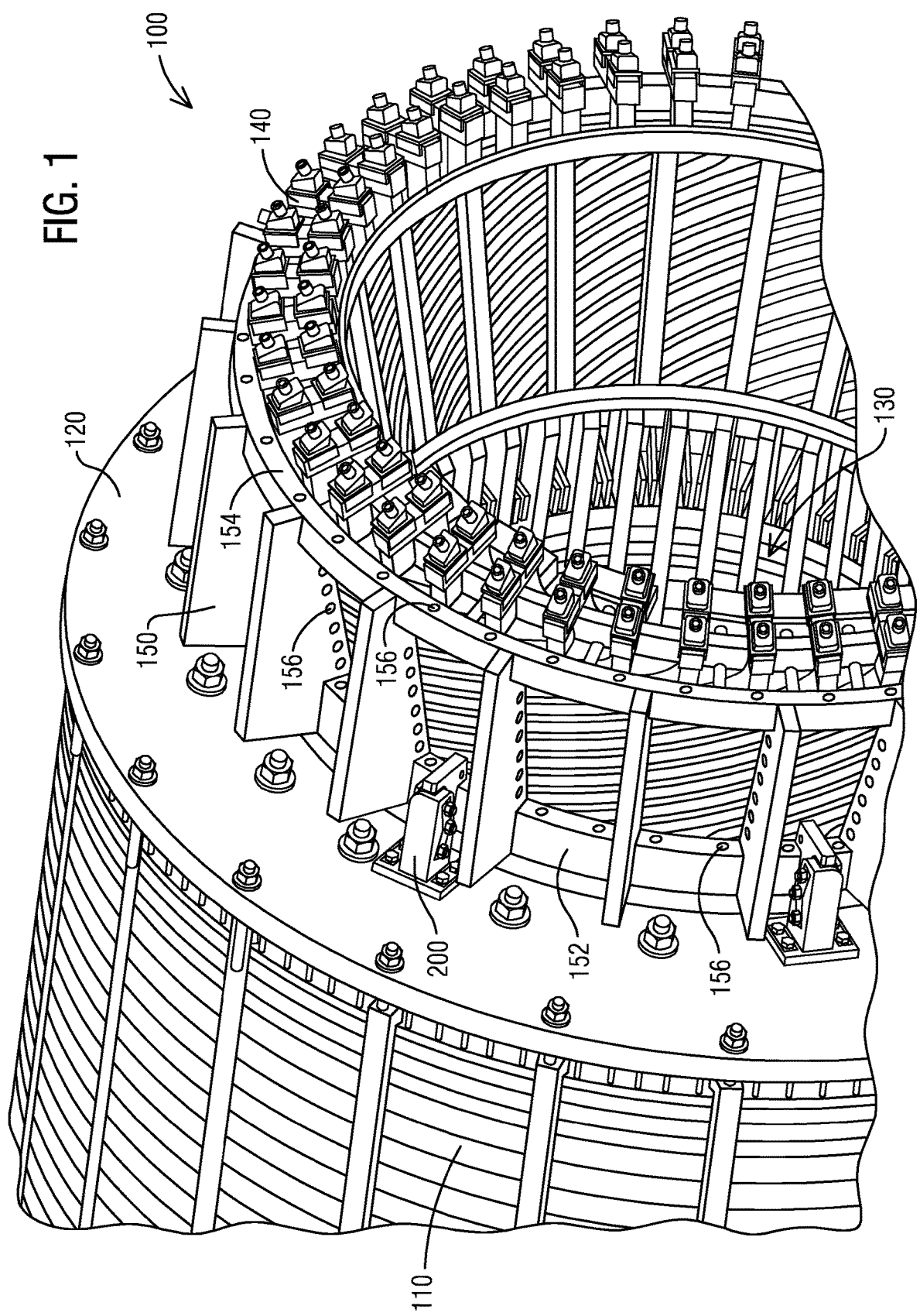
FIG. 1 illustrates a schematic perspective partial view of a generator stator having an end winding coil support assembly according to an embodiment of the invention.

FIG. 1 illustrates a schematic perspective partial view of a generator stator 100 having an end winding coil support assembly 200 according to an embodiment of the invention. The generator stator 100 has a stator core 110 and a core flange plate 120. The core flange plate 120 is mounted at each axial end of the stator core 110. The generator stator 100 has a plurality of end winding coils 140 extending outwardly from the core flange plate 120. The stator core 110 and the end winding coils 140 circumferentially form a bore 130 for accepting a rotor (not shown). The end winding coils 140 may be circumferentially enclosed by an inner support ring 152 and an outer support ring 154 which are axially spaced apart from each other. The outer support ring 154 is axially disposed outwardly from the inner support ring 152. Outer braces 150 are axially disposed between the inner support ring 152 and outer support ring 154. The outer braces 150 may be circumferentially spaced apart from each other around the end winding coils 140. A plurality of holes 156 may be circumferentially disposed on the inner support ring 152 and the outer support ring 154 and axially disposed on the outer braces 150. Bandages (not shown) may pass through the holes 156 and the end winding coils 140 for consolidating the end winding coils 140.

The generator stator 100 includes a plurality of end winding coil support assemblies 200. As shown in the exemplary embodiment of FIG. 1, the end winding coil support assemblies 200 may be secured to the core flange plate 120. The end winding coil support assemblies 200 may be circumferentially disposed along an outer peripheral surface of the core flange plate 120 and spaced apart from each other. The end winding coil support assemblies 200 extend axially outwardly from the core flange plate 120. The end winding coil support assemblies 200 are attached to the inner support ring 152 for supporting the inner support ring 152. The end winding coil support assemblies 200 may include holes 222. Bandages (not shown) may pass through the holes 222 in the end winding coil support assemblies 200 and the holes 156 in the inner support ring 152 for further connection of the end winding coil support assemblies 200 to the inner support ring 152. A total number of the end winding coil support assemblies 200 are determined to provide optimum performance of the generator stator 100. For example, a total number of 6, 7 or 8 end winding coil support assemblies 200 may be circumferentially disposed along the outer peripheral surface of the core flange plate 120 and the inner support ring 152. Other total number of end winding coil support assemblies 200 may also be used. The end winding coil support assemblies 200 may also be attached to the outer support ring 154. The end winding coil support assemblies 200 may also be attached to the end winding coils 140.

Figure 2:
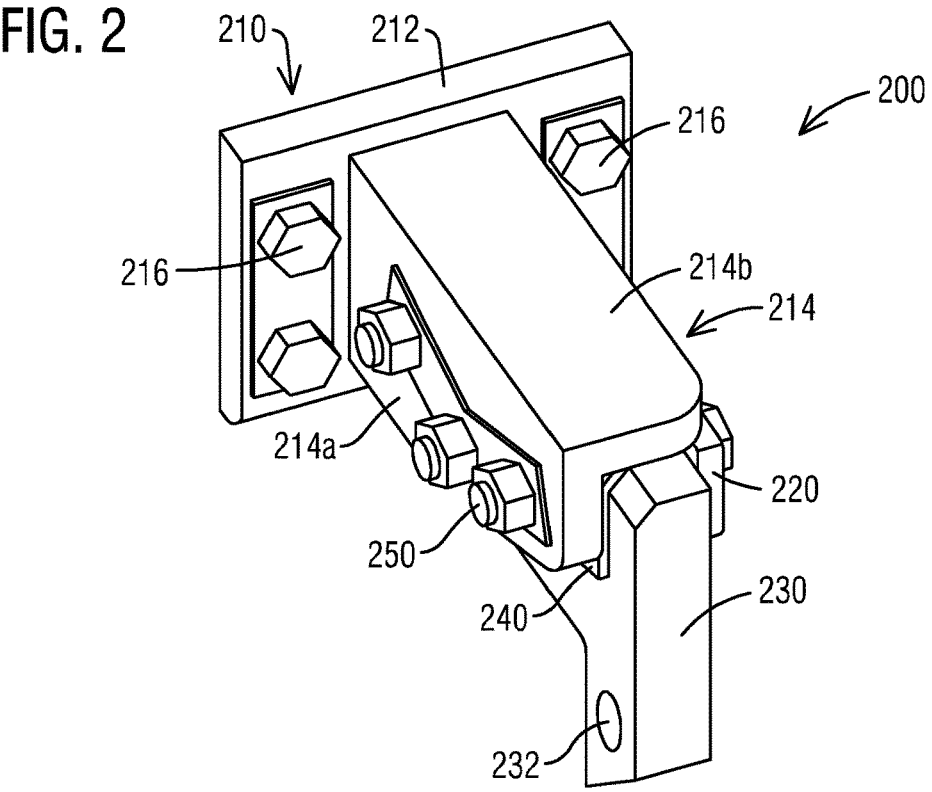
FIG. 2 illustrates a schematic perspective view of a generator stator end winding coil support assembly according to an embodiment of the invention.
Figure 3:
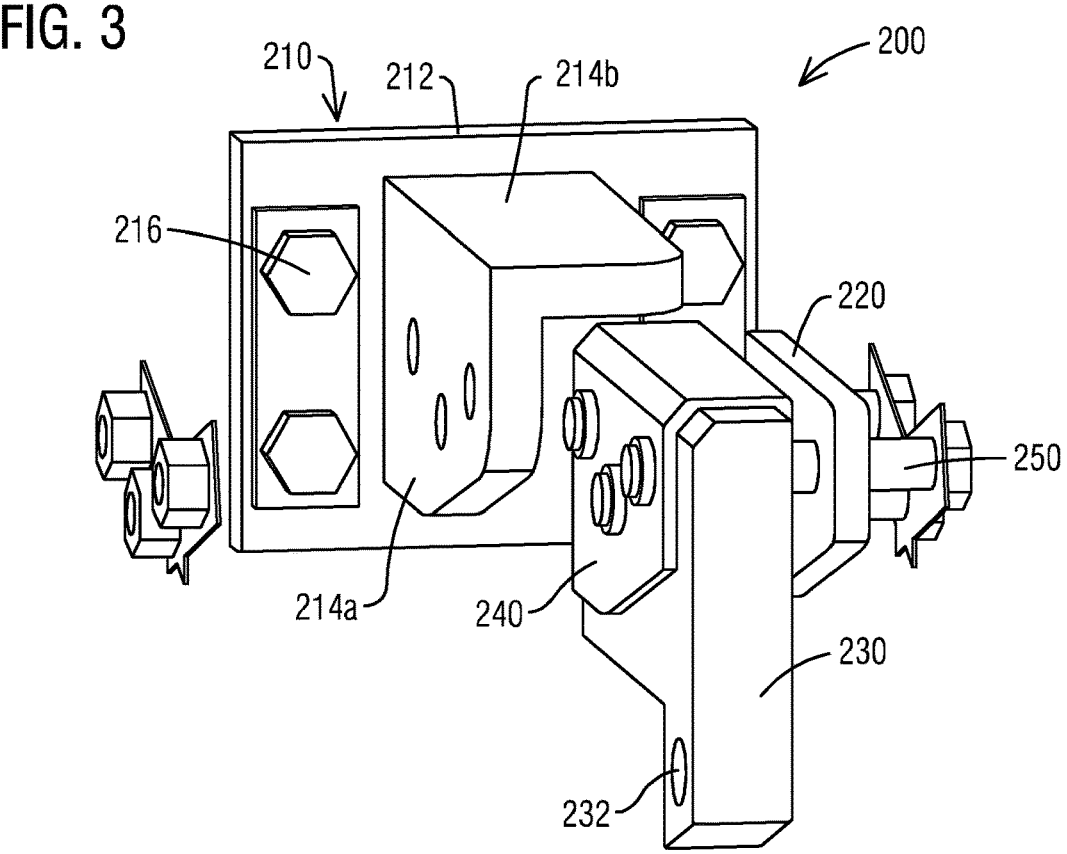
FIG. 3 illustrates a schematic exploded view of a generator stator end winding coil support assembly according to an embodiment of the invention.
Figure 4:
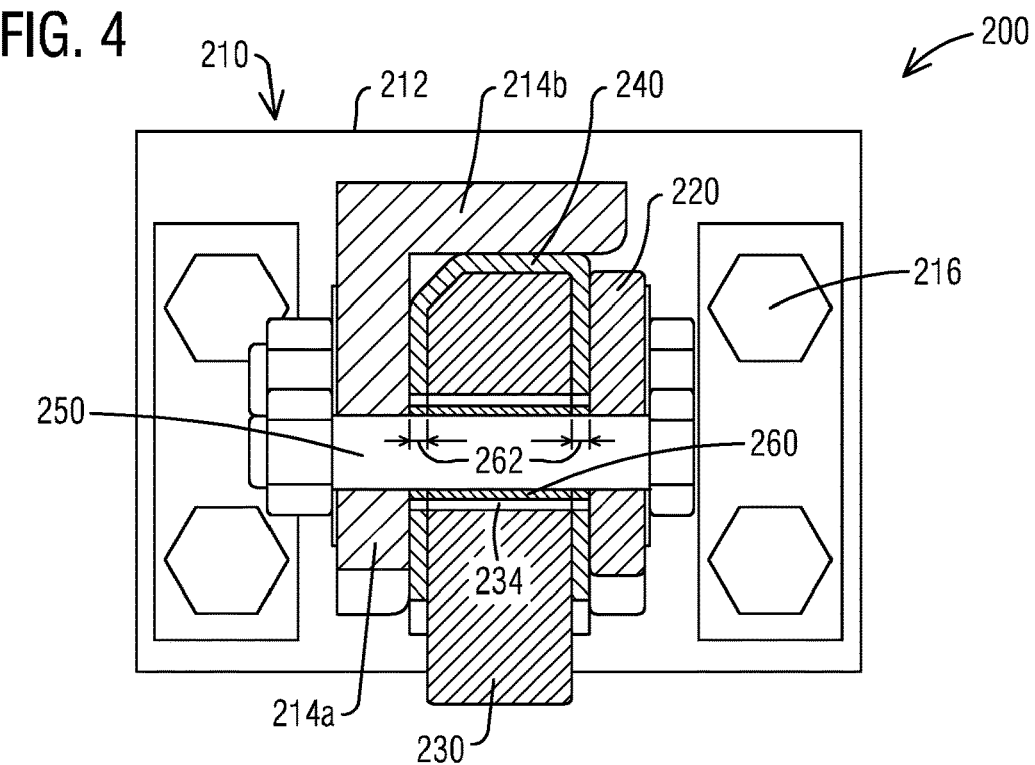
FIG. 4 illustrates a schematic front view of a generator stator end winding coil support assembly according to an embodiment of the invention.
Figure 5:
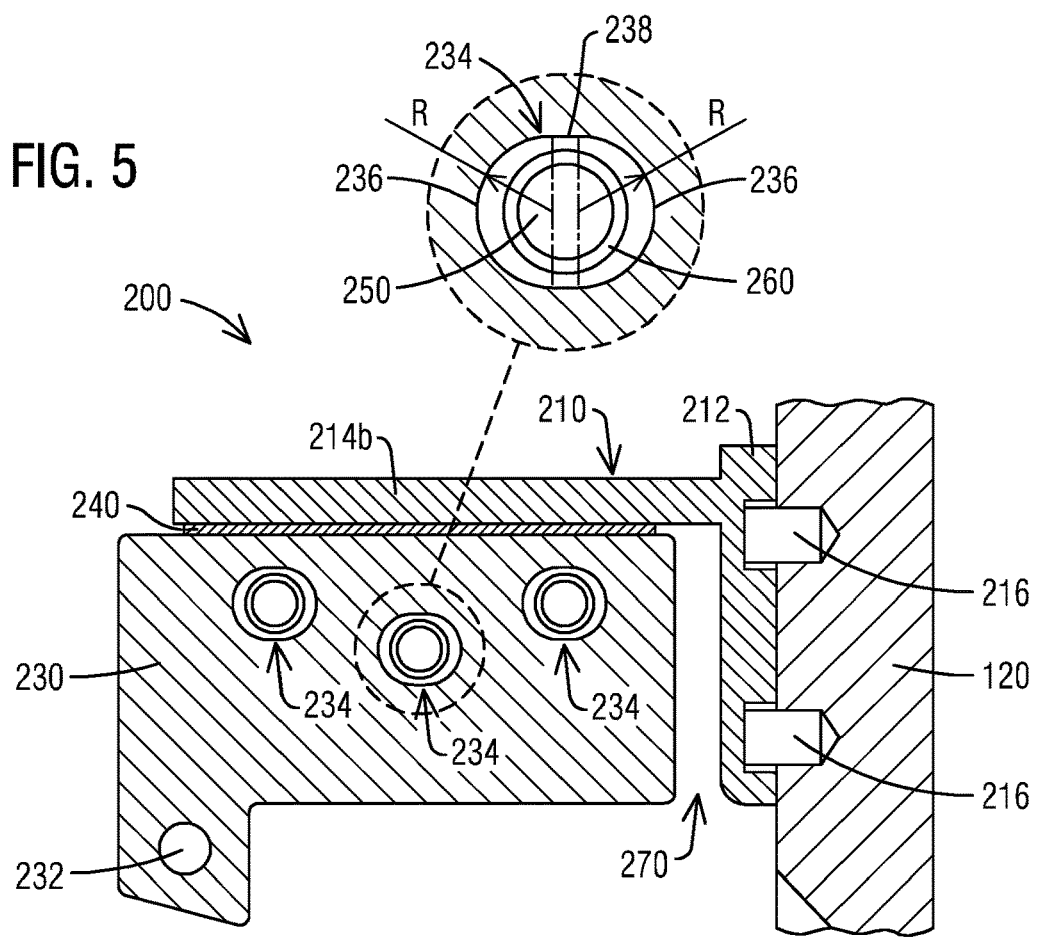
FIG. 5 illustrates a schematic side view of a generator stator end winding coil support assembly according to an embodiment of the invention.

The end winding coil support assembly 200 is described in detail with the following figures. FIG. 2 illustrates a schematic perspective view of a generator stator end winding support assembly 200 according to an embodiment of the invention. FIG. 3 illustrates a schematic exploded view of the generator stator end winding support assembly 200 as shown in FIG. 2. FIG. 4 illustrates a schematic front view of the generator stator end winding support assembly 200 as shown in FIG. 2. FIG. 5 illustrates a schematic side view of a generator stator end winding support assembly 200 as shown in FIG. 2.

According to the exemplary embodiment shown in FIGS. 2 to 5, the end winding coil support assembly 200 includes a bracket 210. The bracket 210 includes a first bracket plate 212 for securing the end winding coil support assembly 200 to the core flange plate 120 by fasteners 216, such as bolts. The first bracket plate 212 may be secured to the core flange plate 120 by other means, such as by welding, or by dovetail joint. The first bracket plate 212 may be rigidly secured to the core flange plate 120. The bracket 210 includes a second bracket plate 214 extending axially outwardly from the first bracket plate 212. The second bracket plate 214 may be attached to the first bracket plate 212 as an integral piece, such as by welding. The second bracket plate 214 may be perpendicular to the first bracket plate 212. The second bracket plate 214 may have an L-shape having a radial plate 214a extending radially and a tangential plate 214b extending tangentially. The bracket 210 may be made from austenitic steel.

The end winding coil support assembly 200 also includes a backup plate 220. The backup plate 220 is arranged in parallel to the radial plate 214a of the L-shaped second bracket plate 214 forming a U-shaped space with an opening downward to the inner support ring 152. A brace 230 is disposed between the backup plate 220 and the L-shaped second bracket plate 214 radially extending therethrough the U-shaped space downwardly. Lower section of the brace 230 may be L-shaped and interfaces with the inner support ring 152 in both axial and radial directions. The brace 230 may be connected to the inner support ring 152 by resin impregnated conformable layer that is placed in notches (not shown) in the inner support ring 152. The lower section of the brace 230 may have hole 232 for additionally connection to the inner support ring 152 by bandages. Mat (not shown) may be disposed between the brace 230 and the inner support ring 152. Resin impregnated conformable material may be used for this purpose. The brace 230 may be made from insulation materials so that no free floating potential occurs. The insulation materials may include glass-fabric material.

An elastic layer 240 is disposed around the brace 230 at interfaces between the brace 230 and the second bracket plate 214 and between the brace 230 and the backup plate 220. The elastic layer 240 may be made from a material that has a compliant compression characteristic to a stress such that the elastic layer 240 is able to accommodate vibrations and damping of the generator stator 100 during operation. The elastic layer 240 may be made from materials, such as elastomers, viscoelastic, rubbers, silicon, Viton®, nitrile, or spring materials such as metals, composites, etc. The elastic layer 240 may be adhesively attached to the brace 230, such as by glue. The elastic layer 240 may be bonded to the brace 230.

At least one stud 250 extends through the radial plate 214a of the second bracket plate 214, the backup plate 220, the brace 230 and the elastic layer 240 for clamping said components together. The brace 230 includes an aperture 234 for the stud 250 extending therethrough. The aperture 234 is larger than a diameter of the stud 250 so that the brace 230 may be movable relative to the bracket 210 rigidly secured to the core flange plate 120 and thus the inner support ring 152 is movable relative to the bracket 210 secured to the core flange plate 120. A plurality of studs 250 may be used for clamping the components together. A plurality of apertures 234 are arranged in the brace 230 for the studs 250 extending therethrough. The apertures 234 may be arranged in the brace 230 in a way to maximize distance between the apertures 234 for a strength consideration of the brace 230. In the exemplary embodiment illustrated in FIGS. 1 to 5, the end winding coil support assembly 200 has three studs 250 extending therethrough the radial plate 214a of the second bracket plate 214, the backup plate 220, the brace 230 and the elastic layer 240. The components may be clamped together by other means, such as by bonding, by a wedge device, or by an external C-Clamp.

With reference to the front and side views of the embodiment of the end winding coil support assembly 200 as illustrated in FIG. 4 and FIG. 5, a sleeve 260 is disposed in the aperture 234. The sleeve 260 encloses the stud 250 extending therethrough the aperture 234. The sleeve 260 is held between the radial plate 214a of the second bracket plate 214 and the backup plate 220 by a clamping force of the stud 250. The sleeve 260 sets up a gap 262 at interfaces between the brace 230 and the radial plate 214a and between the brace 230 and the backup plate 220 in which the elastic layer 240 is disposed. The gap 262 defines a compression of the elastic layer 240 under stress induced in operation of the generator stator 100 such that the elastic layer 240 may accommodate vibrations and damping of the generator stator 100 during operation. Compression of the elastic layer 240 enables the brace 230 to move relative to the bracket 210 rigidly secured to the core flange plate 120 during operation. The inner support ring 152 connected to the brace 230 may move with the brace 230. The end winding coil support assembly 200 may thus flexibly support the end winding coils 140. The sleeve 260 may be made from materials which do not deform by the clamping force of the stud 250.

During operation of the generator stator 100, a plurality of different load conditions may be applied. Different load conditions require the end winging coil support assembly 200 to provide different flexibility and stiffness support. For example, flexibility is required to reduce variables, such as forces and resulting strains due to thermal expansion, while stiffness is required to control magnitudes of steady state vibration and to control variables, such as natural frequency of the end winging coil support assembly 200. The end winding coil support assembly 200 uses a non-linear nature of the elastic layer 240 to control these variables. The flexibility and stiffness of the support may be controlled by amount of compression of the elastic layer 240. According to an embodiment, a clamping force of the stud 250 may be adjustable so that the sleeve 260 may set up a gap 262 for defining a compression of the elastic layer 240 based on load condition requirements. According to an embodiment, the elastic layer 240 may be selected to have a desired compression characteristic for controlling flexibility and stiffness support based on load condition requirements. According to an embodiment, thickness of the elastic layer 240 may be defined based on load condition requirements. For example, the elastic layer 240 may be a sheet of rubber. Thickness of the elastic layer 240 may be about 5 mm. Compression of the elastic layer 240 may also control strains due to abnormal operating conditions such as three phase circuits and control amount of damping of the end winging coil support assembly 200 for dynamic response.

An enlarged view of the aperture 234 is illustrated in FIG. 5. The aperture 234 may have a shape of two semi circles 236 axially oriented opposite to each other. The two semi circles 236 are connected by an axial section 238. Each semi circle 236 has a radius that is larger than a radius of the sleeve 260. The radius of the sleeve 260 is larger than a radius of the stud 250 extending therethrough. The larger dimension of the aperture 234 and the elastic layer 240 disposed around the brace 230 enable the brace 230 to be movable relative to the bracket 210 secured to the core flange plate 120 during operation. A gap 270 is arranged between an axial inboard end of the brace 230 and the first bracket plate 212 secured to the core flange plate 120 for tolerance of an axial movement of the brace 230. Dimensions of the aperture 234, the stud 250 and the sleeve 260 are determined based on load condition requirements. For example, a diameter of the stud 250 may be around 20 mm. A diameter of the sleeve 260 may be around 26 mm. A radius of each semi circle 236 may be around 16 mm. Length of the axial section 238 connecting the two semi circles 236 may be around 5 mm.

According to an aspect, the proposed generator stator end winding coil support assembly 200 may provide a balance between desired flexibility and stiffness support to the end winding coils 140 in different load conditions. The balance may be achieved by adjusting a clamping force of the stud 250 so that the sleeve 260 may set up a desired gap 262 to define a compression of the elastic layer 240. The balance may be achieved by selecting the elastic layer 240 having a desired compression characteristic. The balance may be achieved by a desired thickness of the elastic layer 240.

According to an aspect, the proposed generator stator end winding coil support assembly 200 increases reliability of the generator stator 100 and reduces design cycle time and cost of the generator stator 100. The proposed generator stator end winding coil support assembly 200 also reduces manufacturing cost of the generator stator 100.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator Stator
110: Stator Core
120: Core Flange Plate
130: Bore
140: End Winding Coils
150: Brace between Inner Support Ring and Outer Support Ring
152: Inner Support Ring
154: Outer Support Ring
156: Hole for Bandage
200: End Winding Coil Support Assembly
210: Bracket
212: First Bracket Plate
214: Second Bracket Plate
214a: Radial Plate of Second Bracket Plate
214b: Tangential Plate of Second Bracket Plate
216: Fastener for Connection to Core Flange Plate
220: Backup Plate
230: Brace
232: Hole for Bandage
234: Aperture for Stud
236: Semi Circle
238: Axial Section
240: Elastic Layer
250: Stud
260: Sleeve
262: Gap between Brace and Backup Plate and between Radial Plate and Brace
270: Gap between Axial Inboard End of Brace and First Bracket Plate What claimed is:

1. A generator stator comprising:
a stator core;
a core flange plate mounted at an axial end of the stator core;
a plurality of end winding coils extending axially outwardly from the core flange plate;
an inner support ring axially located inboard and circumferentially enclosing the end winding coils for supporting the end winding coils; and
a plurality of end winding coil support assemblies circumferentially disposed along an outer peripheral surface of the core flange plate and extending axially outwardly from the core flange plate and connected to the inner support ring,
wherein each end winding coil support assembly comprises:
  a bracket rigidly secured to the core flange plate,
  a backup plate,
  a brace disposed between the bracket and the backup plate and extending radially inwardly connected to the inner support ring,
  an elastic layer disposed around the brace at an interface between the bracket and the backup plate,
wherein at least one stud extends through the bracket, the brace, the elastic layer and the backup plate for clamping said components together,
wherein the brace comprises an aperture having a uniform cross section that is larger than a diameter of the stud extending therethrough,
wherein a sleeve is disposed in the aperture and encloses the stud,
wherein the sleeve sets up a gap at interfaces between the brace and the bracket and between the brace and the backup plate that defines a compression of the elastic layer for accommodating vibration and damping during operation of the generator stator,
wherein the compression of the elastic layer enables the brace to be movable relative to the bracket rigidly secured to the core flange plate for flexibly supporting the end winding coils, and
wherein the uniform cross section of the aperture comprises an oval shape.

2. The generator stator as claimed in claim 1, wherein a clamping force of the stud is adjustable for controlling flexibility and stiffness of the end winding coil support assemblies based on a load condition during the operation.

3. The generator stator as claimed in claim 1, wherein the elastic layer is selected comprising a compression characteristic for controlling flexibility and stiffness of the end winding coil support assemblies based on a load condition during the operation.

4. The generator stator as claimed in claim 1, wherein radius of the semi circles is larger than radius of the sleeve.

5. The generator stator as claimed in claim 1, wherein the bracket comprises a first bracket plate and a second bracket plate, wherein the first bracket plate is rigidly secured to the core flange plate by fasteners, and wherein the second bracket plate is attached to the first bracket plate perpendicularly and extended axially outwardly.

6. The generator stator as claimed in claim 5, further comprising an axial gap between an axial inboard end of the brace and the first bracket plate for tolerance of an axial movement of the brace.

7. The generator stator as claimed in claim 5, wherein the second bracket plate comprises a L-shape having a radial plate and a tangential plate.

8. The generator stator as claimed in claim 7, wherein the backup plate is arranged in parallel to the radial plate of the L-shaped second bracket plate.

9. An assembly for supporting end winding coils of a generator stator, wherein the generator stator comprises a stator core, a core flange plate mounted at an axial end of the stator core and an inner support ring circumferentially enclosing the end winding coils extending axially outwardly from the core flange plate, the assembly comprising:
a bracket rigidly secured to the core flange plate;
a backup plate;
a brace disposed between the bracket and the backup plate and extending radially inwardly connected to the inner support ring; and
an elastic layer disposed around the brace at an interface between the bracket and the backup plate,
wherein at least one stud extends through the bracket, the brace, the elastic layer and the backup plate for clamping said components together,
wherein the brace comprises an aperture having a uniform cross section that is larger than a diameter of the stud extending therethrough,
wherein a sleeve is disposed in the aperture and encloses the stud,
wherein the sleeve sets up a gap at interfaces between the brace and the bracket and between the brace and the backup plate that defines a compression of the elastic layer for accommodating vibration and damping during operation of the generator stator, wherein the compression of the elastic layer enables the brace to be movable relative to the bracket rigidly secured to the core flange plate for flexibly supporting the end winding coils, and wherein the uniform cross section of the aperture comprises an oval shape.

10. The assembly as claimed in claim 9, wherein a clamping force of the stud is adjustable for controlling flexibility and stiffness of the end winding coil support assemblies based on a load condition during the operation.

11. The assembly as claimed in claim 9, wherein the elastic layer is selected comprising a compression characteristic for controlling flexibility and stiffness of the end winding coil support assemblies based on a load condition during the operation.

12. The assembly as claimed in claim 9, wherein radius of the semi circles is larger than radius of the sleeve.

13. The assembly as claimed in claim 9, wherein the bracket comprises a first bracket plate and a second bracket plate, wherein the first bracket plate is rigidly secured to the core flange plate by fasteners, and wherein the second bracket plate is attached to the first bracket plate perpendicularly and extended axially outwardly.

14. The assembly as claimed in claim 13, wherein an axial gap exists between an axial inboard end of the brace and the first bracket plate for tolerance of an axial movement of the brace.

15. The assembly as claimed in claim 13, wherein the second bracket plate comprises a L-shape having a radial plate and a tangential plate.

16. The assembly as claimed in claim 15, wherein the backup plate is arranged in parallel to the radial plate of the L-shaped second bracket plate.

17. A method for supporting end winding coils of a generator stator, wherein the generator stator comprises a stator core, a core flange plate mounted at an axial end of the stator core and an inner support ring circumferentially enclosing the end winding coils extending axially outwardly from the core flange plate, the method comprising:

rigidly securing a bracket to the core flange plate;

disposing a brace between the bracket and a backup plate and extending radially inwardly connected to the inner support ring;

disposing an elastic layer around the brace at an interface between the bracket and the backup plate; and clamping the backup plate, the brace, the elastic layer and the bracket together by at least one stud extending therethrough, wherein the brace comprises an aperture having a uniform cross section that is larger than a diameter of the stud extending therethrough, wherein a sleeve is disposed in the aperture and encloses the stud, wherein the sleeve sets up a gap at interfaces between the brace and the bracket and between the brace and the backup plate that defines a compression of the elastic layer for accommodating vibration and damping during operation of the generator stator, wherein the compression of the elastic layer enables the brace to be movable relative to the bracket rigidly secured to the core flange plate for flexibly supporting the end winding coils, and wherein the uniform cross section of the aperture comprises an oval shape.

18. The method as claimed in claim 17, further comprising adjusting a clamping force of the stud for controlling flexibility and stiffness of the end winding coil support assemblies based on a load condition during the operation.

\* \* \* \* \*